(12) United States Patent
Barzen

(10) Patent No.: US 10,779,457 B2
(45) Date of Patent: Sep. 22, 2020

(54) AGRICULTURAL VEHICLE HAVING RECONFIGURABLE CONTROLS

(71) Applicant: AGCO INTERNATIONAL GmbH, Neuhausen (CH)

(72) Inventor: Alexander Barzen, Ettlingen (DE)

(73) Assignee: AGCO International GmbH, Neuhausen (CH)

( * ) Notice: Subject to any disclaimer, the term of this patent is extended or adjusted under 35 U.S.C. 154(b) by 256 days.

(21) Appl. No.: 15/726,653

(22) Filed: Oct. 6, 2017

(65) Prior Publication Data

US 2018/0098481 A1 Apr. 12, 2018

(30) Foreign Application Priority Data

Oct. 7, 2016 (GB) .................................. 1617031.8

(51) Int. Cl.
*A01B 71/02* (2006.01)
*A01B 59/00* (2006.01)
(Continued)

(52) U.S. Cl.
CPC .............. *A01B 71/02* (2013.01); *A01B 59/00* (2013.01); *A01D 34/008* (2013.01); *B60K 25/00* (2013.01); *B60K 35/00* (2013.01); *B60K 37/06* (2013.01); *B60R 11/0264* (2013.01); *B62D 49/0692* (2013.01); *B60K 2370/122* (2019.05);
(Continued)

(58) Field of Classification Search
CPC ...... A01L 359/00; A01L 71/02; A01L 34/008; A01D 34/008; B60K 25/00; B60K 35/00; B60K 37/06; B60K 2370/1438; B60K 2370/195; B60K 2370/797; B60R 2011/004; G06F 3/147; G06F 3/0488; G06F 3/04847
See application file for complete search history.

(56) References Cited

U.S. PATENT DOCUMENTS 3,889,976 A * 6/1975 Jesswein .............. B62D 49/007
280/400
4,462,079 A * 7/1984 Ito ............................ G07C 5/10
340/684
(Continued)

FOREIGN PATENT DOCUMENTS

DE 20 2012 003217 U1 7/2013
EP 1595734 A1 11/2005
(Continued)

OTHER PUBLICATIONS

European Patent Office, International Search Report for related EP Application No. 17 19 4755, dated Apr. 3, 2018.
(Continued)

*Primary Examiner* — Mussa A Shaawat

(57) ABSTRACT

An agricultural tractor having an auxiliary control station located outside of the tractor cab. The auxiliary control station is used for the actuation of tractor components, e.g. hydraulic cylinders, when an operator is outside of the cab. The auxiliary control station has a user interface which allows the external controls of the auxiliary control station to be reassigned to operate different actuatable elements of the tractor, thereby providing for increased ease-of-use of the tractor when an operator is outside of the cab.

11 Claims, 3 Drawing Sheets

(51) Int. Cl.
*A01D 34/00* (2006.01)
*B60R 11/02* (2006.01)
*B60K 37/06* (2006.01)
*B62D 49/06* (2006.01)
*B60K 25/00* (2006.01)
*B60K 35/00* (2006.01)
*B60R 11/00* (2006.01)
*G06F 3/0484* (2013.01)
*G06F 3/0488* (2013.01)
*G06F 3/147* (2006.01)

(52) U.S. Cl.
CPC ............ *B60K 2370/1438* (2019.05); *B60K 2370/151* (2019.05); *B60K 2370/1537* (2019.05); *B60K 2370/195* (2019.05); *B60K 2370/55* (2019.05); *B60K 2370/61* (2019.05); *B60K 2370/682* (2019.05); *B60K 2370/797* (2019.05); *B60R 2011/004* (2013.01); *B60R 2011/0288* (2013.01); *B60Y 2200/221* (2013.01); *G06F 3/0488* (2013.01); *G06F 3/04847* (2013.01); *G06F 3/147* (2013.01)

(56) References Cited

U.S. PATENT DOCUMENTS

| | | | | |
|---|---|---|---|---|
| 5,884,205 A * | 3/1999 | Elmore | ............. | A01B 79/005 222/63 |
| 5,889,671 A | 3/1999 | Boettinger et al. | | |
| 5,897,600 A * | 4/1999 | Elmore | ............. | A01C 17/006 172/4.5 |
| 6,039,141 A * | 3/2000 | Denny | ............. | B60N 2/797 180/329 |
| 6,070,538 A * | 6/2000 | Flamme | ............. | A01B 79/005 111/170 |
| 2002/0161541 A1* | 10/2002 | Hou | ............. | G01L 25/00 702/105 |
| 2006/0252597 A1* | 11/2006 | Williams | ............. | F16H 61/66 477/107 |
| 2007/0213906 A1* | 9/2007 | Montgomery | ............. | G06F 3/048 701/50 |
| 2010/0109380 A1* | 5/2010 | Jorgensen | ............. | B60S 1/0896 296/190.01 |
| 2012/0191307 A1* | 7/2012 | Matsuzaki | ............. | B60W 10/103 701/51 |
| 2013/0258567 A1* | 10/2013 | Eul | ............. | B60R 11/0264 361/679.01 |
| 2015/0173296 A1* | 6/2015 | Wafler | ............. | A01D 46/20 182/129 |
| 2018/0319398 A1* | 11/2018 | Ogura | ............. | F16H 61/00 |
| 2019/0053417 A1* | 2/2019 | Beaujot | ............. | A01B 63/1006 |

FOREIGN PATENT DOCUMENTS

| | | |
|---|---|---|
| EP | 2 952 376 A2 | 12/2015 |
| JP | H04 136008 U | 12/1992 |
| WO | 2014/095159 A1 | 6/2014 |

OTHER PUBLICATIONS

UK Intellectual Property Office, International Search Report for priority Application No. GB1617031.8, dated Mar. 17, 2017.
AGCO Corporation, Fendt 700 Vario Brochure located @ https://www.fendt.com/us/geneva-assets/widget/14292/321631_fendt-700-brochure-english.pdf.

* cited by examiner

AGRICULTURAL VEHICLE HAVING RECONFIGURABLE CONTROLS

BACKGROUND

Field of the Invention

The present invention relates to an agricultural vehicle, in particular an agricultural tractor.

Description of Related Art

It is known for agricultural tractors to have external controls for the operation of components of the tractor, when the operator is outside of the cab. Tractors such as the Fendt® 700 Vario provide external controls in the form of pushbuttons on the rear mudguard of the tractor, for operation of hydraulic valves controlling the rear linkage of the tractor. The accessibility of such controls when outside of the cab allows for implements to be easily mounted to the linkage, as the operator has direct and close access to both the linkage and the external controls.

As the number of possible actuatable elements on a tractor increased, this would require a corresponding increase in the number of external controls required to operate each element. This can lead to an increase in cost and complexity for tractor design.

In some tractors, the in-cab user stations can allow for considerable customisation of tractor functions, based on user preference. In such tractors, the in-cab user stations can also allow for the reconfiguration of the connections between the external pushbuttons and different valves on the tractors, such that a limited number of external controls can be used to selectively operate a larger number of actuatable elements. However, for an operator to reassign the external controls, they must return to the in-cab user station to perform the reassignment, and must then remember which external controls have been assigned to which actuatable elements. As the number of possible combinations of elements and controls increase, this can present challenges to the operator to remember accurately.

As a result, it is an object of the invention to provide an agricultural vehicle having an improved control scheme.

SUMMARY OF THE INVENTION

Accordingly, there is provided an agricultural tractor comprising:
 a cab having an operator station;
 a plurality of actuatable elements; and
 an auxiliary control station external of the cab having at least one external control for operation of the actuatable elements of the tractor when an operator is outside of the cab,
 wherein the auxiliary control station is provided with a user interface to allow for re-configuration of the at least one external control at the auxiliary control station.

By providing an additional user interface at the auxiliary external control station, the operator can easily reassign the external controls of the external control station without returning to the cab. This allows for reduced operational time, as the operator does not have to return to the cab to perform a reassignment, and also provides for improved ease-of-use as the operator does not have to remember the details of the different assignments which have been reconfigured. In addition, the number of external controls can be minimised due to the reconfigurable aspect of the external control station. It will be understood that re-configuration of the external controls may comprise re-assigning different controls of the auxiliary control station to different actuatable elements. It will further be understood that the auxiliary control station may be provided with a single reconfigurable external control, or a plurality of external controls.

Preferably, the actuatable elements of the tractor comprise at least one of the following: hydraulic valves, hydraulic cylinders e.g. lifting cylinders for a front or rear hitch. In a further aspect, the actuatable elements may comprise electric motors of the tractor, which allows for limited movement and repositioning of the tractor from the auxiliary control station.

In one embodiment, the user interface comprises at least one button operable to cycle through different configurations of the external controls of the auxiliary control station.

In this embodiment, the number of controls may be minimised to a single set of actuation buttons, and at least one cycle button to allow the single set of actuation buttons to control any of the actuatable elements of the tractor. Alternatively, the at least one cycle button can reconfigure the external controls between different predefined control schemes, wherein the external controls are configured to control different arrangements of the actuatable elements. For example, one predefined control scheme may be directed toward controlling the elements of the rear linkage.

Preferably, the different configurations of external controls may be user-defined from the operator station in the cab.

An operator may use the improved interface of the in-cab operator station to define a series of templates for the external controls, which may then be cycled through using a relatively basic control provided as part of the user interface at the auxiliary control station, e.g. a single cycle button.

Preferably, the auxiliary control station comprises a display screen to indicate the configuration of the external controls.

Providing a display screen at the external control station allows the operator to easily see the current configuration of the external controls.

Additionally or alternatively, the controls of the auxiliary control station comprise changeable indicators which indicate the current control configuration of the external controls.

The indicators may comprise colour-changing lights, wherein the actuatable elements of the tractor can be denoted by different colours of the colour-changing lights. For example, the different actuatable elements may be provided in different colours, such that when the external control is lit up in a blue colour, this indicates that the particular control is currently configured to actuate the blue actuatable element.

Additionally or alternatively, the external controls comprise individual display screens incorporated into the controls, wherein the individual display screens display an indication of the actuatable element currently operated by each external control.

The external controls or buttons may incorporate display screens or have display screens provided directly adjacent the controls, the screens arranged to display icons or other indications of the currently-controlled actuatable element. The screens may comprise LCD or LED screens.

In a further aspect, the user interface of the auxiliary control station comprises a touch screen display to allow re-configuration of the external controls at the auxiliary control station.

The use of a touch screen display provides for improved ease-of-use for the vehicle operator, as the operator can easily see and adjust the current configuration of external controls and actuatable elements.

Preferably, the configuration of the external controls is lockable. Preferably, the locking status of the external controls may be set from the in-cab operator station.

Preferably, the auxiliary control station is positioned at the rear of tractor, preferably on a rear fender or mudguard. Such a rear control station is primarily used for control of rear linkage elements. Additionally or alternatively, an auxiliary control station can be positioned at the front of the tractor, for control of front linkage elements.

Preferably, the auxiliary control station comprises a cover or shield to protect the auxiliary control station when not in use.

Preferably, the tractor comprises a controller arranged to re-configure the external controls of the auxiliary control station to actuate different elements of the plurality of actuatable elements.

BRIEF DESCRIPTION OF THE DRAWINGS

Embodiments of the invention will now be described, by way of example only, with reference to the accompanying drawings, in which.

DETAILED DESCRIPTION

Figure 1:
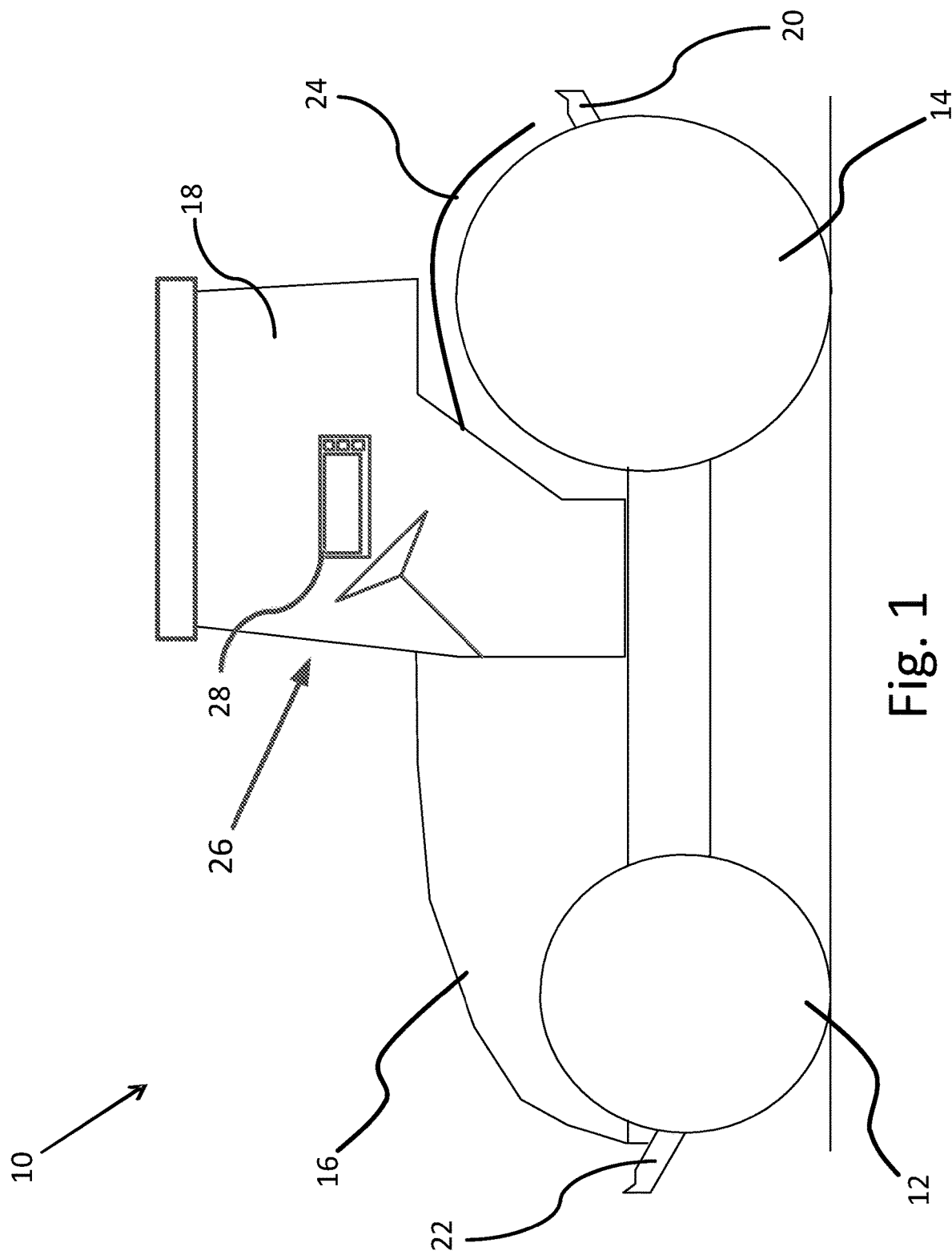
FIG. 1 is a side view of an agricultural tractor according to the invention.

With reference to FIG. 1, a vehicle according to the invention in the form of an agricultural tractor is indicated at 10. The tractor 10 comprises front wheels 12 and rear wheels 14, a forward engine section 16 and a cab section 18. A rear linkage 20 is provided at the rear of the tractor 10, and a front linkage 22 is provided at the front of the tractor 10. The front and rear linkages 20,22 can be actuated or moved using associated hydraulic cylinders. Rear fenders 24 are provided to cover a portion of the rear wheels 14.

Within the cab 18, an operator station 26 is provided. The operator station 26 comprises a user interface device 28 which is used to display information relating to tractor operation, and to control different elements of the tractor 10.

Figure 2:
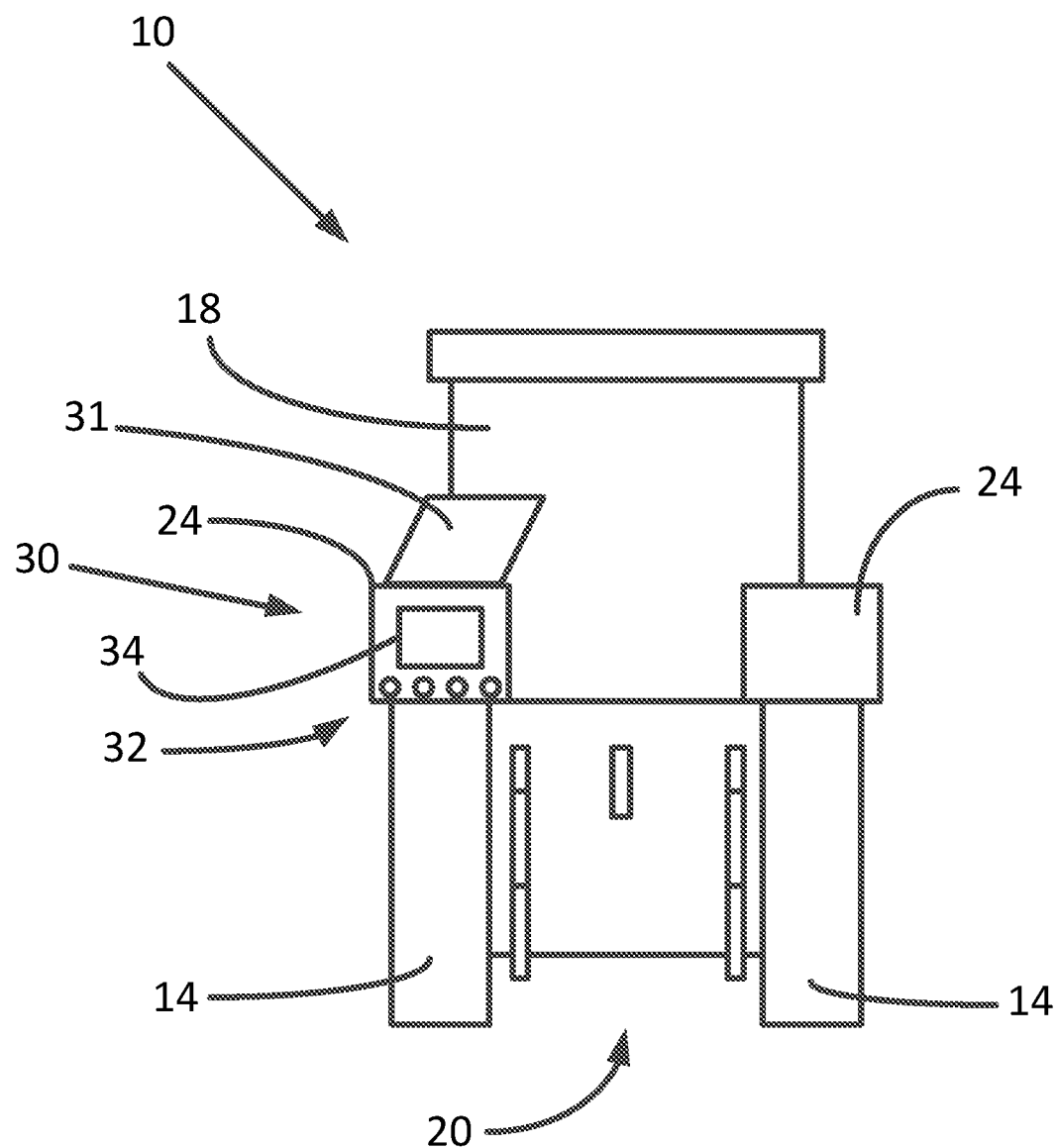
FIG. 2 is a rear plan view of the tractor of FIG. 1.

With reference to FIG. 2, a rear view of the tractor 10 is provided. An auxiliary control station 30 is located on one of the rear fenders 24. The auxiliary control station 30 comprises a plurality of external control elements 32, e.g. buttons or levers, which can be used to control operation of different elements of the tractor 10 when the tractor operator is outside of the cab 18. Preferably, the external control elements 32 can be used to actuate different hydraulic cylinders of the tractor 10, to control operation of the tractor linkages 20,22. The auxiliary control station 30 is provided with a cover 31 which acts to protect the elements of the auxiliary control station 30 when not in use. The cover 31 may be hinged or pivoted to the rear fender 24. The cover 31 may shield some or all of the auxiliary control station 30, e.g. shielding elements of the user interface of the auxiliary control station 30 while allowing access to the control elements 32. The cover 31 may be transparent to allow an operator to see the current status of the auxiliary control station 30, even when the cover 31 is closed. While the illustrated embodiment shows an auxiliary control station 30 having a plurality of external controls 32, it will be understood that the auxiliary control station 30 may alternatively be provided with just a single reconfigurable external control, for actuation of different elements of the tractor 10.

The auxiliary control station 30 is provided with a user interface to allow for re-configuration of the control elements 32 at the auxiliary control station 30. This allows for a limited number of control elements 32 to be used to control a greater number of actuatable components of the tractor 10, as the individual control elements 32 can be reassigned to control different actuatable components of the tractor 10 as required. In the embodiment of FIG. 2, the auxiliary control station 30 is provided with a display 34, as part of the user interface of the auxiliary control station 30.

Figure 3:
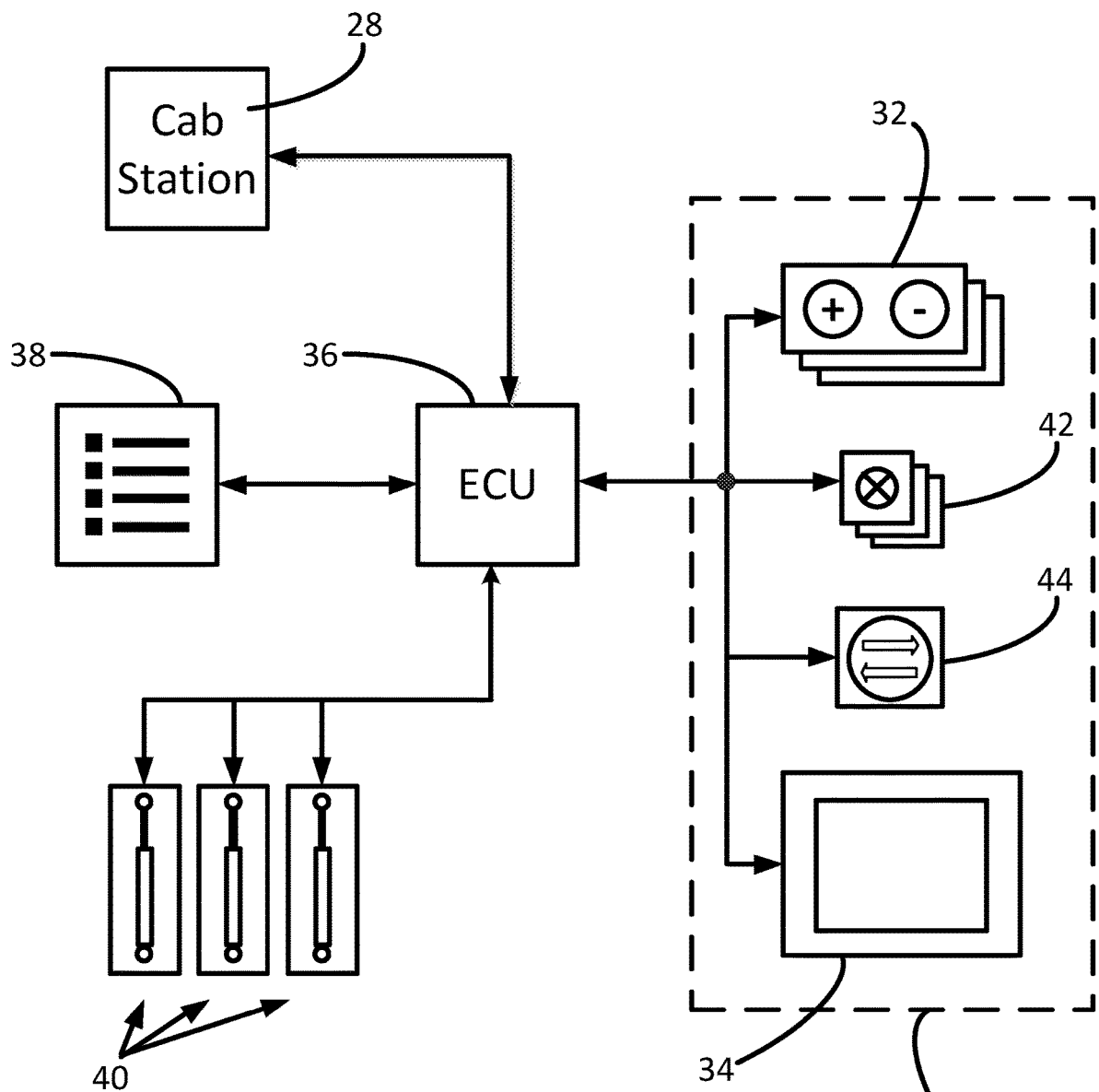
FIG. 3 is an illustration of a control system for the tractor of FIG. 1.

FIG. 3 provides an illustrative schematic of the control system for the auxiliary control station 30, which is indicated by the broken-line outline. The tractor 10 is provided with a controller or electronic control unit (ECU) 36. The ECU 36 may be provided as a stand-alone control device for the auxiliary control station 30, or may be implemented as part of a centralised controller of the tractor 10, which is operable to control any of the tractor components. The ECU 36 is coupled with the in-cab operator station 28 as well as a memory storage device 38. In addition, the ECU 36 is communicatively coupled with a plurality of actuatable elements 40 in the tractor 10, such that the ECU 36 can control the actuation of the individual elements, dependent on signals received from either the in-cab operator station 28 or the auxiliary control station 30. The actuatable elements 40 may comprise any controllable actuator device provided on the tractor 10, preferably hydraulic cylinders for the operation of the tractor linkages 20,22.

The ECU 36 is communicatively coupled with the user interface elements of the auxiliary control station 30. In the embodiment of FIG. 3, the auxiliary control station 30 comprises a plurality of control elements 32 of operation of different elements of the tractor 10. The control elements 32 may comprise any suitable control device, e.g. a series of push buttons, rotary dials, levers, a keypad interface, etc. As previously shown in FIG. 2, the auxiliary control station 30 further comprises a display device 34 arranged to display information relating to the control of the actuatable elements 40, for example information may be provided on the display 34 illustrating which of the control elements 32 controls which actuatable element 40. The display device 34 may comprise a touch-screen display, allowing for an operator to control the operation or configuration of the auxiliary control station 30.

The ECU 36 is operable to allow for the configuration of the control elements 32 and the actuatable elements 40 to be changed, such that the control elements 32 can be re-assigned to control the operation of different actuatable elements 40 as required. In particular, the auxiliary control station 30 allows for the reconfiguration of the control elements 32 and the actuatable elements 40 to be performed from the auxiliary control station 30, such that an operator does not have to return to the in-cab operation station 28 to perform a re-assignment of controls.

The ECU 36 is further connected with a plurality of indicator devices 42, which may be used to indicate the current assignment or configuration of the communication between the control elements 32 and the actuatable elements 40. Each of the control elements 32 may have an individual indicator device 42 associated therewith, such that the indicator device 42 displays an indication of which actuatable element 40 is currently controlled by each control element 32. For example, the actuatable elements 40 may each be provided with a different representative colour, e.g. blue, red, green, yellow, and wherein the indicator device 42 comprises colour-changing lamps which can illuminate in a colour corresponding to the particular actuatable element 40 to which the individual control element 32 is currently coupled. Additionally or alternatively, the indicator devices 42 may comprise a mini display, e.g. an LCD or LED screen, which can display an icon or other representation of the currently-configured function of the control element 32.

The indicator devices 42 may be arranged adjacent to the control elements 32, or the indicator devices 42 may be provided as part of each control element 32, e.g. a push button having an incorporated colour-changing lamp or mini display.

The auxiliary control station 30 shown in FIG. 3 is further provided with an additional control element or button 44 which acts to cycle the configuration of control elements 32 and actuatable elements 40 through a range of different predefined assignations. The use of a one-button user interface to cycle through the different configurations of control elements 32 provides a simple mechanism for the reassignment of the controls 32 to the different actuators 40. In this case the ECU 36 is arranged to select between a plurality of configuration templates setting out predefined assignments of control elements 32 and actuatable elements 40, and to cycle through said configuration templates based on operation of the cycling button 44. The templates may be retrieved from the memory storage 38 for use by the ECU 28. The templates may be pre-loaded onto the tractor 10, and/or the templates may be created by an operator for later use, e.g. using the in-cab operator station 28 or the user interface of the auxiliary control station 30.

While the embodiment of FIG. 3 shows the actuatable elements 40 as comprising hydraulic cylinders, it will be understood that the control elements 32 of the invention may be arranged to control other systems of the tractor 10. For example, the actuatable elements 40 may comprise engine management systems and steering systems, e.g. electric motors of the tractor, which can allow for limited movement and repositioning of the tractor 10 from the auxiliary control station 30.

It will be understood that different embodiments of the auxiliary control station 30 can be provided with different combinations of the user interface elements 32, 34, 42, 44 without departing from the invention, e.g. the auxiliary control station 30 may just comprise the controls 32 and the single cycle button 44 to cycle through different control configurations, or the auxiliary control station 30 may just comprise a single touch screen display 34 which allows for reassignment as well as control of the different actuatable elements 40.

While the illustrated embodiment shows the auxiliary control station 30 positioned at the rear of the tractor 10, it will be understood that an additional or alternative auxiliary control station 30 may be provided at the front of the tractor 10, e.g. for control of the front linkage 22 or other elements located towards the front of the tractor 10.

The use of an auxiliary control station comprising user interface elements that allow for re-assignment of the controls of the auxiliary control station to different actuatable elements provides for an improved operator experience, as the operator does not have to return to an in-cab control station to re-assign different control elements. Accordingly, the invention provides an agricultural vehicle having greater flexibility and ease of use.

The invention is not limited to the embodiments described herein, and may be modified or adapted without departing from the scope of the present invention.

The invention claimed is:

1. An agricultural tractor, comprising:
    a cab having an operator station;
    a plurality of actuatable elements; and
    an auxiliary control station external of the cab having:
        at least one external control for operation of the actuatable elements,
        a user interface to allow for re-configuration of the at least one external control, wherein the user interface comprises at least one button operable to cycle through different configurations of the at least one external control of the auxiliary control station and wherein the different configurations of the at least one external control are user-defined from the operator station in the cab.

2. The agricultural tractor of claim 1, wherein the actuatable elements comprise at least one of the following: electric motors, hydraulic valves, and hydraulic cylinders.

3. The agricultural tractor of claim 1, wherein the auxiliary control station comprises a display screen to indicate the configuration of the at least one external control.

4. The agricultural tractor of claim 1, wherein the at least one external control comprises changeable indicators which indicate the current configuration of the at least one external control.

5. The agricultural tractor of claim 1, wherein the at least one external control comprises a display screen incorporated into the external control, wherein the screen displays an indication of the actuatable element currently operated by each of the at least one external controls.

6. The agricultural tractor of claim 1, wherein the user interface of the auxiliary control station comprises a touch screen display to allow re-configuration of the at least one external control at the auxiliary control station.

7. The agricultural tractor of claim 1, wherein the configuration of the at least one external control is lockable from the operator station in the cab.

8. The agricultural tractor of claim 1, wherein the auxiliary control station is positioned at a rear portion of the tractor, for control of one or more rear linkage elements.

9. The agricultural tractor of claim 1, wherein the auxiliary control station is positioned at a front portion of the tractor, for control of one or more front linkage elements.

10. The agricultural tractor of claim 1, wherein the auxiliary control station comprises a cover or shield to protect the auxiliary control station when not in use.

11. The agricultural tractor of claim 1, wherein the tractor further comprises a controller arranged to re-configure the at least one external control of the auxiliary control station to actuate different elements of the plurality of actuatable elements.

* * * * *